(12) United States Patent
Welle et al.

(10) Patent No.: US 12,061,943 B2
(45) Date of Patent: Aug. 13, 2024

(54) MEASURING DEVICE WITH NEAR FIELD INTERACTION DEVICE

(71) Applicant: VEGA Grieshaber KG, Wolfach (DE)

(72) Inventors: Roland Welle, Hausach (DE); Joerg Boersig, Schapbach (DE); Steffen Waelde, Niedere-schach (DE)

(73) Assignee: VEGA Grieshaber KG, Wolfach (DE)

( * ) Notice: Subject to any disclaimer, the term of this patent is extended or adjusted under 35 U.S.C. 154(b) by 635 days.

(21) Appl. No.: 17/055,761

(22) PCT Filed: Jul. 18, 2019

(86) PCT No.: PCT/EP2019/069378
§ 371 (c)(1),
(2) Date: Nov. 16, 2020

(87) PCT Pub. No.: WO2020/016361
PCT Pub. Date: Jan. 23, 2020

(65) Prior Publication Data
US 2021/0209433 A1    Jul. 8, 2021

(30) Foreign Application Priority Data
Jul. 20, 2018   (EP) .................................. 18 184 810

(51) Int. Cl.
*G06K 19/07*   (2006.01)
*G01F 23/292*  (2006.01)
*G01F 23/296*  (2022.01)

(52) U.S. Cl.
CPC ....... *G06K 19/0723* (2013.01); *G01F 23/292* (2013.01); *G01F 23/296* (2013.01)

(58) Field of Classification Search
CPC .... G01F 23/2962; G01F 23/26; G01F 23/261;
G01F 23/263; G01F 23/265;
(Continued)

(56) References Cited

U.S. PATENT DOCUMENTS 4,491,016 A    1/1985  Haefner
6,438,462 B1   8/2002  Hanf et al.
(Continued)

FOREIGN PATENT DOCUMENTS

CA    2272007 A1    11/1999
CN    101853565 A   10/2010
(Continued)

OTHER PUBLICATIONS

ESPACENET Machine Translation of WO 2019/101788 A1 Which Originally Published On May 31, 2019. (Year: 2019).*
(Continued)

*Primary Examiner* — Nathaniel T Woodward
(74) *Attorney, Agent, or Firm* — Sterne, Kessler, Goldstein & Fox P.L.L.C.

(57) ABSTRACT

The invention relates to measuring devices or display devices and a method for operating these devices, in particular instruments for level measurement, for level detection, for detecting the topology of a product surface or for displaying the measured values of these instruments. A measuring device or display device has an RFID unit. The RFID unit is set up to exchange data with a memory on an external command from an external communication device, to switch a controllable switch on and off, and/or to transfer energy to an energy storage device.

13 Claims, 10 Drawing Sheets

(58) Field of Classification Search
CPC ...... G01F 23/266; G01F 23/268; G01F 23/28;
G01F 23/282; G01F 23/2845; G01F
23/2928; G01F 23/2922; G01F 23/2924;
G01F 23/2925; G01F 23/2927; G01F
23/2921; G01F 23/292; G01F 23/2961;
G01F 23/296; G01F 23/2963; G01F
23/2965; G01F 23/2966; G01F 23/2967;
G01F 23/2968; H01Q 1/2225; H01Q
1/2216; H01Q 1/2233; H01Q 1/2208;
H01Q 1/225
See application file for complete search history.

(56) References Cited

U.S. PATENT DOCUMENTS

| | | | |
|---|---|---|---|
| 6,545,946 B1* | 4/2003 | Huss | G01S 7/527 367/87 |
| 7,219,536 B2* | 5/2007 | Liu | G01N 33/2888 73/54.24 |
| 7,321,774 B1 | 1/2008 | Lau et al. | |
| 7,821,410 B2 | 10/2010 | Higashionji et al. | |
| 7,933,733 B2 | 4/2011 | Ashrafzadeh et al. | |
| 7,982,623 B2* | 7/2011 | Higashionji | G01F 23/284 73/290 R |
| 7,986,236 B2* | 7/2011 | Erikson | G06K 19/07749 340/572.8 |
| 8,150,462 B2 | 4/2012 | Guenter et al. | |
| 8,179,266 B2 | 5/2012 | Hermle | |
| 8,237,561 B2* | 8/2012 | Beigel | H01Q 1/2225 340/10.33 |
| 8,416,090 B2 | 4/2013 | Bucciero | |
| 8,464,583 B2* | 6/2013 | Sears | G01F 23/2962 73/290 V |
| 8,733,664 B2 | 5/2014 | Loeffler et al. | |
| 8,893,977 B2* | 11/2014 | Baarman | G06K 19/0717 235/487 |
| 8,922,366 B1 | 12/2014 | Honoré et al. | |
| 8,924,167 B2* | 12/2014 | Decker | G01F 23/2962 73/304 C |
| 8,948,279 B2* | 2/2015 | Volpi | G06K 7/10366 375/150 |
| 9,030,457 B2* | 5/2015 | Liu | G09G 3/20 345/211 |
| 9,057,453 B2* | 6/2015 | Pitchford | F16K 31/088 |
| 9,113,844 B2* | 8/2015 | Hollstien | A61B 5/686 |
| 9,135,547 B2* | 9/2015 | Forster | G06K 19/07318 |
| 9,211,811 B2* | 12/2015 | Breed | B60N 2/2863 |
| 9,441,997 B2 | 9/2016 | Downie et al. | |
| 9,664,552 B2* | 5/2017 | Reimer | F01N 3/2066 |
| 9,824,246 B2* | 11/2017 | Lee | G06K 7/10009 |
| 9,886,660 B2 | 2/2018 | Hammerschmidt et al. | |
| 9,904,347 B2 | 2/2018 | Allgaier et al. | |
| 9,912,385 B2 | 3/2018 | Holweg et al. | |
| 9,991,596 B2* | 6/2018 | Rokhsaz | H01Q 1/2291 |
| 10,024,705 B2 | 7/2018 | Kech | |
| 10,030,818 B2 | 7/2018 | Hoskins et al. | |
| 10,068,467 B1* | 9/2018 | Pennebaker, III | G01F 23/804 |
| 10,188,230 B2* | 1/2019 | Hambrock | A47G 19/2227 |
| 10,502,610 B2 | 12/2019 | Fehrenbach et al. | |
| 10,559,138 B2* | 2/2020 | Worden | G07C 5/008 |
| 10,953,157 B2* | 3/2021 | Klemm | G01F 23/268 |
| 11,547,801 B2* | 1/2023 | Grygus | A61M 5/2033 |
| 2001/0050651 A1 | 12/2001 | Grangeat et al. | |
| 2007/0018832 A1* | 1/2007 | Beigel | G06K 19/07762 340/572.7 |
| 2007/0180903 A1* | 8/2007 | Gao | G01F 23/2968 73/290 V |
| 2007/0236359 A1 | 10/2007 | Wynans et al. | |
| 2010/0106446 A1* | 4/2010 | Ashrafzadeh | G01F 23/2928 702/116 |
| 2010/0106624 A1 | 4/2010 | Ashrafzadeh et al. | |
| 2010/0222895 A1 | 9/2010 | Seiler | |
| 2012/0132710 A1 | 5/2012 | Loeffler et al. | |
| 2012/0230319 A1 | 9/2012 | Zaitsu | |
| 2013/0069817 A1 | 3/2013 | Wenger | |
| 2013/0178996 A1 | 7/2013 | Li et al. | |
| 2013/0211870 A1 | 8/2013 | Lawson et al. | |
| 2013/0275572 A1 | 10/2013 | Schaetzle et al. | |
| 2014/0152323 A1* | 6/2014 | Kumar | G01F 23/00 324/658 |
| 2015/0113180 A1 | 4/2015 | Baret et al. | |
| 2016/0131686 A1 | 5/2016 | Handley et al. | |
| 2017/0061174 A1 | 3/2017 | Butler et al. | |
| 2017/0104515 A1 | 4/2017 | Holweg et al. | |
| 2017/0229904 A1 | 8/2017 | Allgaier et al. | |
| 2018/0031687 A1 | 2/2018 | Mueller et al. | |
| 2018/0093042 A1* | 4/2018 | Klemm | G01F 23/265 |
| 2018/0183855 A1 | 6/2018 | Sabella et al. | |
| 2018/0365549 A1* | 12/2018 | Nikitin | G06K 7/10158 |
| 2019/0021529 A1* | 1/2019 | Schucker | A47G 23/16 |
| 2019/0281370 A1 | 9/2019 | Struhsaker et al. | |
| 2021/0094735 A1* | 4/2021 | Bentkovski | G01F 23/802 |
| 2023/0211930 A1* | 7/2023 | Bentkovski | B65D 51/248 73/290 R |

FOREIGN PATENT DOCUMENTS

| | | |
|---|---|---|
| CN | 102598805 A | 7/2012 |
| CN | 103376129 A | 10/2013 |
| CN | 107036677 A | 8/2017 |
| DE | 10116871 A1 | 11/2002 |
| DE | 19611942 C2 | 2/2003 |
| DE | 10 2006 055 897 B4 | 2/2009 |
| DE | 102009019657 A1 | 8/2011 |
| DE | 102012112687 A1 | 6/2014 |
| DE | 102015117170 A1 | 4/2017 |
| EP | 2256566 A1 | 12/2010 |
| EP | 2667162 A1 | 11/2013 |
| EP | 2829929 A1 | 1/2015 |
| EP | 3035010 A1 | 6/2016 |
| EP | 3177898 A1 | 6/2017 |
| EP | 3279619 A1 | 2/2018 |
| EP | 3514508 A1 * | 7/2019 |
| GB | 2271691 A | 4/1994 |
| IT | M I20120631 A | 10/2013 |
| JP | 2008-015855 A | 1/2008 |
| JP | 2010-257124 A | 11/2010 |
| KR | 101862143 B1 | 5/2018 |
| TW | M332834 U | 5/2008 |
| TW | M435736 U | 8/2012 |
| TW | 201503627 A | 1/2015 |
| WO | WO 2002/082248 A2 | 10/2002 |
| WO | WO 2012/114749 A1 | 8/2012 |
| WO | WO 2013/156945 A1 | 10/2013 |
| WO | WO 2014/083340 | 6/2014 |
| WO | WO 2014/095256 A1 | 6/2014 |
| WO | WO 2016/019982 A1 | 2/2016 |
| WO | WO 2016/116167 A1 | 7/2016 |
| WO | WO-2019101788 A1 * | 5/2019 ............. B65D 51/24 |
| WO | WO-2019141725 A1 * | 7/2019 ............. B61D 5/00 |

OTHER PUBLICATIONS

Official Action of Substantive Examination issued in Russian Application No. 2020143349/28(080878), mailed Jul. 11, 2022, 16 pages.
Fan Wu et al., "WE-Safe: A Self-Powered Wearable IoT Sensor Network for Safety Application based on LoRa", IEEE Access, Special Section on Wearable and Implantable Devices and Systems, published Jul. 25, 2018, vol. 6, 8 pages.
Fabiano Salvadori et al., "Monitoring in Industrial Systems Using Wireless Sensor Network With Dynamic Power Management", IEEE Transactions on Instrumentation and Measurement, Sep. 9, 2009, vol. 58, 8 pages.
M. Kesraoui et al., "Design of a smart grid for an isolated village supplied with renewable energies", 2013 Eighth International Conference and Exhibition on Ecological Vehicles and Renewable Energies (EVER), 2013, 7 pages.
Office Action issued in U.S. Appl. No. 16/515,902 mailed Apr. 2, 2021, 23 pages.

(56) References Cited

OTHER PUBLICATIONS

European Search Report issued in DE Application No. 18184774.0, dated Jan. 17, 2019, 9 pages.
European Search Report issued in DE Application No. 18184802.9, dated Jan. 21, 2019, 8 pages.
EP International Search Report issued in International Application No. PCT/EP2019/069378, dated Sep. 26, 2019, 6 pages.
International Preliminary Report on Patentability and Written Opinion of the International Searching Authority issued in PCT Application No. PCT/EP2019/069378, mailed Jan. 26, 2021, 9 pages.
Chinese Office Action directed to Chinese Patent Application No. 201980048201.X, mailed Nov. 18, 2023; 15 pages.
Chinese Office Action directed to Chinese Patent Application No. 201910644283.6, mailed Oct. 25, 2023; 17 pages.

\* cited by examiner

MEASURING DEVICE WITH NEAR FIELD INTERACTION DEVICE

REFERENCE TO RELATED APPLICATIONS

The present application claims the priority of European patent application No. 18 184 810.2, filed on 20 Jul. 2018, which is fully incorporated by reference in the present document.

FIELD OF THE INVENTION

The invention relates to measuring devices or display devices and a method for operating these devices, in particular devices, for example instruments for level measurement, for limit level determination, for detecting the topology of a product surface or for displaying the measured values of these instruments. Examples of such devices are an impedance level switch, a vibrating level switch, a level measuring instrument with a high-frequency front-end, ultra-sound front-end or laser front-end or an display device, for example with a low-energy display. The invention also relates to a use, a program element and a computer-readable medium.

BACKGROUND

Various types of sensor systems are used for level measurement, for example in a container. Some of these sensor or display systems are connected to a power supply system, some are configured as stand-alone devices, i.e. these devices are used independently of a power supply system and therefore depend on a battery or similar. Some embodiments are encapsulated, CGS:THU e.g. for reasons of corrosion protection, so that changing the battery can be time-consuming. It is therefore important to operate these devices in an energy-saving manner, and also that these devices can be accessed both when switched on and off.

SUMMARY OF THE INVENTION

It is an object of the invention to provide a system architecture and a method by means of which battery-powered devices can be operated in an energy-efficient manner and can be accessed both in the on and off state.

This object is solved by the subject matter of the independent claims. Further developments of the invention result from the sub-claims and the following description.

A measuring device or display device, in particular a measuring device or display of a device for level measurement, flow measurement or pressure measurement, comprises an RFID unit. The RFID unit is arranged to exchange data with a memory of the measuring device or display device on an external command from an external communication device, to switch a controllable switch of the measuring device or display device on and off, and/or to transfer energy to an energy storage device to the measuring device or display device. The measuring device or display device is also referred to hereinafter as the "instrument".

The external communication device may—as a kind of predefined data transmission—send a command to the RFID unit of the device. In particular, the command can be a digitally coded command or a bit sequence. In particular, the bit sequence may consist of at least two different bits. The bit sequence can be transmitted via RFID using known methods. In one version, the RFID unit has an RFID antenna and an RFID circuit. The RFID antenna may be a coil, which is integrated e.g. on a conductor track or in a circuit. The RFID circuit may be configured to support a variety of protocols, such as an NFC (Near Field Communication) protocol or a proprietary protocol. The proprietary protocol may be a superset of a standard protocol. In the case of a near field communication link, the RFID device may use a connection that supports at least all protocol levels of standardised near field communication. Near field communication is a transmission standard for the contactless exchange of data via electromagnetic induction. It supports transmission over short distances (i.e. a few centimetres).

The external communication device can be a specialised communication device whose transmission and, if necessary, reception behaviour is adapted to the device by its specific design. The external communication device may also be a smartphone or tablet capable of communicating with the RFID unit and adapted to the specifics of the RFID unit and device, e.g. by means of an app.

The RFID unit according to an embodiment is set up to exchange data with the memory of the device. It may be intended here to implement writing to or reading from the device memory with the aid of a processor. The memory can be—at least partially—volatile or non-volatile. The memory will be used, for example, for parameterisation data, control data, measurement data, time information and other types of data. Data can thus be exchanged between the external communication device and the RFID unit and between the RFID unit and the memory of the device, and thus between the external communication device and the memory of the device. Data exchange allows relevant data—e.g. of the type specified above—to be read (sent to the RFID unit) and/or modified (received from the RFID unit) both when the device is in operation and when it is switched off.

According to an embodiment the device is set up to switch the controllable switch on and off. For this purpose, the RFID unit acts on the controllable switch via a control line. The control line can act directly on the controllable switch or indirectly, for example via a control unit. The device can be connected to a permanent power supply (mains), it can also have an energy storage device or be connected exclusively to an energy storage device.

In one embodiment, the RFID unit is set up to permanently switch on the controllable switch. The permanent switching on can be realised e.g. by means of a self-holding circuit.

The RFID unit is configured to transmit energy to or from the energy storage device according to a design. For this purpose, the RFID unit is set up to transfer energy from the RFID unit to the energy storage device, i.e. to charge the energy storage device, upon a corresponding command, e.g. by switching the charge path. The RFID unit can also be set up to transfer energy from the energy storage device to the RFID unit, i.e. to charge the external communication device via the RFID unit. In doing so, a power of at least 10 mW, in particular 1000 mW, is transmitted.

Other commands may also be transmitted to the device, such as switching an optical signal (e.g. a green LED lamp) or an acoustic signal (e.g. a buzzer) on and off.

For example, the fact that the device does not need to be switched on for reading and/or changing data means that the device can be operated in a very energy-saving manner. This system architecture of the device means that it is no longer necessary for the entire device to be switched on intermittently, but parts of the device can be switched off when no measurement or display is taking place. Some types of display devices can have parts of the device turned off as long as the display does not change. Examples of such models include displays that use electronic paper (e-paper). In addition, it is possible to turn the machine on or off at any time, if necessary, so that you can quickly switch to using all the features of the machine that you need. Furthermore, charging the device ensures a long service life, and charging an external device through the device enables a wide and convenient use.

In one embodiment, the measuring device or display unit has an energy storage device. This can be a battery, an accumulator (accumulator) or capacitor, a fuel cell or a similar device.

The energy storage device may be designed to complement a permanent power supply, or as part of a self-contained device, or as a combination of both.

In one embodiment, the device has a measuring front end and/or a display front end. The unit can therefore have at least two types of front-end which are not operated continuously but only when they are connected to the energy storage device via the switch, i.e. when they are switched on. The measurement front-end is set up to measure a measured value which includes a level, a flow or a pressure. The measuring front-end can be designed, for example, as an impedance limit switch, as a vibration limit switch, as a level radar, especially as a high-frequency front-end, as an ultrasonic front-end or as a laser front-end. The display front end is set up to display the measured value. In the case of a display device, parts of the device may be switched off if no display is made. With some versions of a display device, parts of the device may be switched off as long as the display does not change.

The device also has a calculation and control unit (hereinafter also referred to as "calculation unit") which is set up to receive and process the measured value from the measurement front end and/or to prepare and send the measured value to the display front end. The computing unit is connected to the energy storage unit via the controllable switch and can therefore also be switched on and off via the switch—and by means of the control unit. The calculation and control unit enables e.g. pre-processing and/or encryption of the measured data and contributes to making the device more flexible and/or suitable for a wider range of applications. The calculation unit can also be used for the parameterisation of the measuring front end and/or display front end. Parameterisation in this context means the adaptation of the measurement front-end or display front-end to the specified application area. Examples are the standard measuring range or interference signal suppression for measuring front ends and the display range for display front ends.

In the case of versions with a measurement front end and/or display front end, the system architecture of the device can reduce the energy consumption by several orders of magnitude, at least in some versions, because a measurement or display takes significantly less than one second, but the intervals between measurements can be hours or even several days. In addition, the above-mentioned system architecture of the device ensures that the (mostly) switched-off device can also be accessed. Even when the device is switched off, measurement data can be read out and/or parameterisation data, software updates and other types of data can be entered into the memory.

The calculation and control unit has a memory. This can be the memory connected to the RFID unit, but it can also be a separate memory that can access the memory of the RFID unit in some forms, possibly using a processor. The memory can be—at least partially—volatile or non-volatile. The memory is used, for example, for the arithmetic operations of the computing unit, but it can also be used for parameterisation data, for control data, for measurement data, for time information and other types of data. The memory can also be used to receive and process the measured value from the measurement front end and/or to prepare and send the measured value to the display front end.

In one embodiment, the consumer also has a radio unit which is designed to transmit data to a server and/or receive data from the server. The radio unit is a transmitter and/or receiver of, for example, a low-energy wide area traffic network. These networks are also called LPWAN (Low Power Wide Area Network). The radio unit is used to communicate with other devices or a server. The radio unit can be used to transmit measurement data, parameterisation, time information and other data.

In one embodiment, the consumer of the device still has a communication device. The communication device may, for example, use short-range radio technology, e.g. a protocol from the Wireless Personal Area Network (WPAN) family, for reasons of energy conservation. Examples are IEEE 802.15 connections, such as a connection using Bluetooth®, ZigBee®, CSS and/or UWB, or a connection using infrared-based protocols, such as an IrDA (Infrared Data Association) protocol or a proprietary protocol. The connection can also use a wireless LAN (WLAN). The range of these standards is a few meters, which makes it easy to operate the machine. As operation is only carried out for a relatively short period of time, the energy storage device can provide the increased power supply required for this without any noticeable loss of energy storage capacity.

In one embodiment, the device also has a console that is either connected to the energy storage unit via another line or has its own energy storage unit. The console is set up to switch the controllable switch on and off, in particular by means of the control unit. The console is either connected to the energy storage unit via a further line and/or has its own energy storage unit. The console can be used, for example, to switch the device on and off, to charge the energy storage device (if it is rechargeable) or to update software.

In one embodiment, the control unit can include a time management unit, which is arranged to control the switch by means of time information from the RFID unit, the radio unit and/or the console. The time information can be an absolute time or point in time (e.g. "11:07"), a relative time or time difference (e.g. "in 4 hours"), a combination and/or a repetition of the absolute or relative time.

In one embodiment, the apparatus also has an energy control unit which is designed to supply the load connected via the controllable switch with controlled current and, if there is more than one load, to switch the loads either all loads connected via the controllable switch together or selectively on and off. Prioritisation and/or situation-dependent switching on of the consumers can be carried out. In addition, the energy control unit can be designed in such a way that it ensures a constant voltage for the consumer(s) even if the energy storage device has lost charge or voltage.

The invention also relates to a method of operating a battery-powered device as described above. The method comprises the following steps:

Receiving an external command, in particular from an external communication device, by means of an RFID unit. The command is a type of data transmission that triggers control units in the device to perform predefined actions.

If the command involves receiving data, transmit the data from the RFID unit to a memory in the Processing and Control Unit or other memory in the device. The data can be parameterisation data, for control data, for measurement data, for time information and other types of data.

If the command involves sending data, transfer the data from the memory to the RFID unit. The data can be of the same type as the received data. The data can also be e.g. variables of the processor, so that—together with corresponding send commands—even debugging of the device is possible.

If the command involves switching the device on or off, the controllable switch is switched on or off using the RFID unit and the control unit. In versions where the RFID unit is set up to switch the controllable switch on and off using the control unit, a command can enable the control paths set up for this purpose. In the case of a version where permanent switching on is supported, this can be realised e.g. by means of a self-holding circuit.

If the command involves charging an energy storage device in the machine, energy is transferred from the RFID unit to the energy storage device. In designs the RFID device is set up to charge the energy storage device, a command can enable the control and power transmission paths set up for this purpose.

The invention further relates to a program element which, when executed on a time management unit and/or on a computing and control unit, is suitable for carrying out one of the above mentioned processes.

The invention further relates to a computer-readable medium on which the said program element is stored.

The invention is now described on the basis of embodiments illustrated in the figures. These embodiments are only to be understood as examples, but not as limitations.

Figure 1:
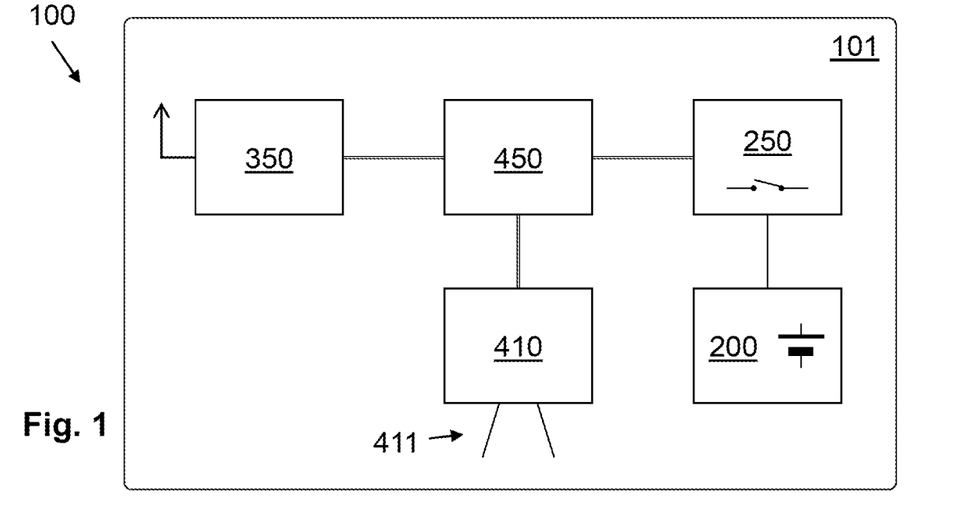
FIG. 1 schematically shows a first embodiment of a unit.

FIG. 1 shows an autonomously operating radar level meter 100. The complete electronics are located in a hermetically sealed housing 101, which completely encloses the electronics and effectively prevents the ingress of dust or moisture. The housing 101 contains an energy storage 200, which supplies the complete sensor electronics with energy. The system is activated at pre-settable intervals, for example once a day, when the controllable switch 250 releases the energy supply for the processor 450. The processor 450 then initialises itself and/or boots an operating system. Once initialisation is complete, a sequence logic integrated in processor 450 controls the recording and provision of a new measured value. For this purpose, the processor first activates the measured value determination unit 410, which, for example, generates a high-frequency signal, radiates it via the antenna 411 through the housing wall or sensor wall 102, and receives the signals reflected by the product again, prepares them and finally makes them available in digital form to the processor 450 for further processing. The measured value determination unit of the measuring front end 410 can be deactivated again after carrying out the described steps. The processor 450 determines the distance to a product from the reflected signals. After activation of the wireless communication device 350, the measured value determined is made available wirelessly to a higher-level communication network, whereby energy-optimised wireless communication methods such as LoRA (LoRaWAN: Long Range Wide Area Network), Sigfox (a proprietary low-power protocol of the French company Sigfox in the ISM band) or NB-IoT (Narrowband IoT) are used in particular. A characteristic of these standards is that the connection to the communication network over the ordered communication network does not have to be continuous, but rather that a connection is established on demand at essentially freely selectable times. After the measured value has been transmitted, the transmission channel is closed again promptly and the communication device 350 is deactivated. When the measurement is complete, the processor 450 opens the controllable switch 250, which converts the system components 350, 450, 410, 411 into a powerless or energy-saving state. For energy-saving and cost reasons, the sensor 350 has neither a display nor an operating unit, so that it is not possible to change the sensor settings or update the software via local operation. If the switch 250 is open, the unit 100 in the version shown in FIG. 1 can no longer be reached via the wireless communication device 350 because this is also switched off.

Figure 2:
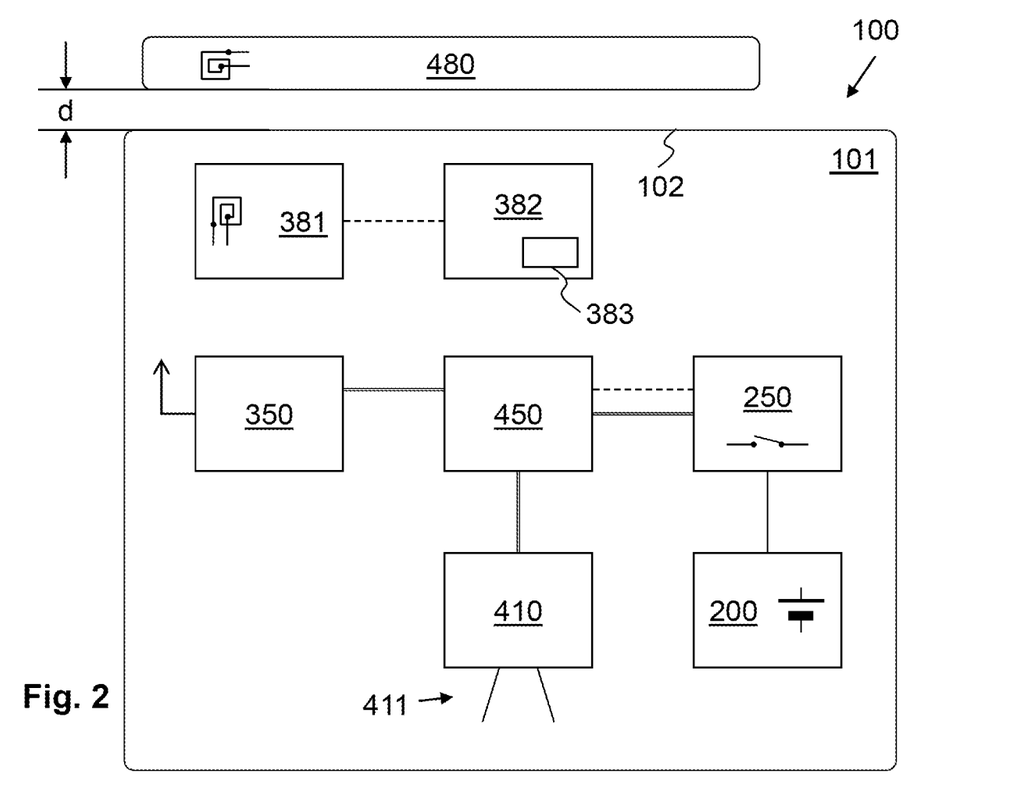
FIG. 2 schematically shows another embodiment of a unit.

FIG. 2 shows another example of a measuring device 100. The measuring device 100 has an RFID antenna 381 inside the hermetically sealed housing 101 and RFID electronics 382 connected to it, for example an RFID chip with integrated persistent memory 383. It may also be intended to integrate the previously described components or parts thereof integrally into the housing wall 102, for example by overmoulding with plastic in an injection moulding process. The memory 383 of the RFID electronics 382 can be read and/or written wirelessly with an external reader 480. For this purpose, the reader 480 transmits energy to the coil 381 and thus to the RFID electronics 382 by means of electromagnetic coupling. The RFID electronics 382 supplies the internal circuits and in particular the memory 383 with the energy provided, which makes it possible to read sensor-specific information (manufacturer, serial number, approvals, order code, time of the next activation, etc.). etc.) becomes possible. The use of NFC technology, which is based on RFID, is particularly advantageous. Since the corresponding circuits for reading NFC chips 382 are available in many smartphones 480 or tablets 480, a reader for reading the information of the memory 383 can be provided in a simple way by installing a suitable app. It may also be intended to store information in memory 383. For example, it may be intended to read the current parameterisation of the sensor 100 from memory 383, to change it in an app and, after establishing an Internet connection to a cloud, to store the changed parameterisation there. In addition, the changed parameterisation can be stored in memory 383. The next time a measurement is activated by running and transmitting the new measured value via the communication device 350, the then active connection can be used to transmit the information stored in the cloud to the device 100 and store it there persistently. In this way, it is possible to change the parameterisation of the sensor with a time delay without having to know the exact time of the next redial via communication device 350. At the same time, the parameterisation can be read out of memory 383 at any time. By knowing the time of the next activation, it is also possible to determine at any time whether the changed parameter setting in the sensor is already effective or not.

A device as shown in FIG. 2 and the above-mentioned example procedure can lead to the fact that changes in the sensor parameterisation only take effect in the sensor with a time delay—for example, one day.

Figure 3:
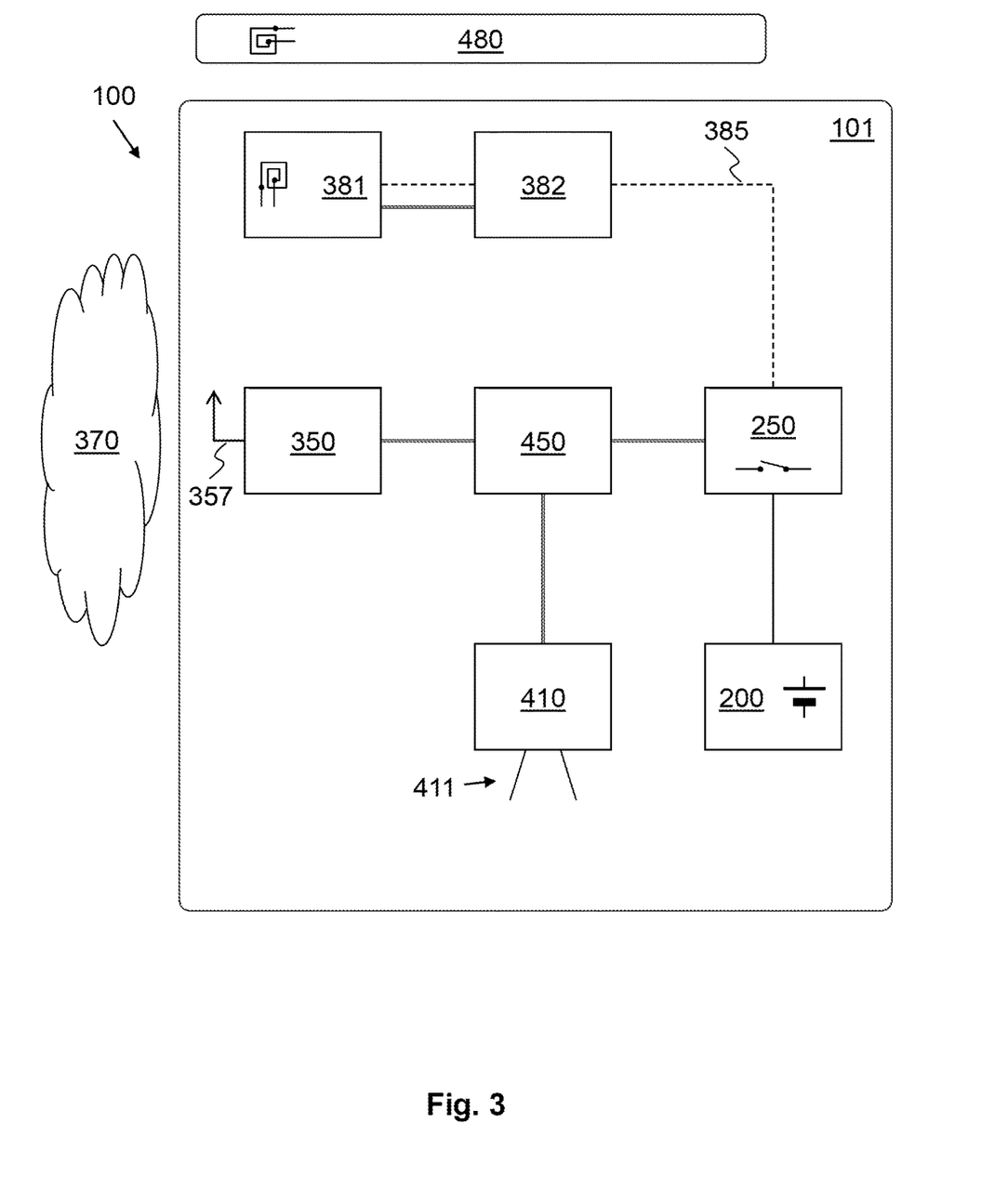
FIG. 3 schematically shows another embodiment of a unit.

FIG. 3 shows another example of an embodiment, which has the advantage of improved interaction with the user. The measuring device 100 according to an aspect of the invention has an extended RFID electronics 382 compared to FIG. 2, which is connected to the controllable switch 250 via a connecting cable 385. If energy is transferred via an operating device 480—via the RFID antenna 381 to the RFID circuit 382—this energy or command activates the controllable switch 250 via the connecting line 385, whereupon the processor 450 is activated, which in particular activates the communication direction 350 in order to establish a connection 357 to a cloud 370. The HMI 480 in turn establishes a connection to the Cloud 370, from which it can call up the information provided by the sensor (e.g. measured values, parameterisation) and display it in a user interface. It is also possible that the operating device 480 writes information back to the Cloud 370, which in turn can be called up promptly (e.g. by cyclic polling) by a correspondingly configured sensor 100. In this example, the RFID device 381, 382 is primarily used to activate the processor 450, whereupon the actual communication channel for operating the processor 450 and/or the measurement front-end 410 takes place via the existing low-power communication device 350. Compared to the example in FIG. 2, the proposed extension is characterised by a significantly reduced reaction time, i.e. in the range of a few seconds (due to the runtime of the smartphone via cloud back to the sensor), which enables interactive active operation of the sensor with prompt feedback of status information.

Figure 4:
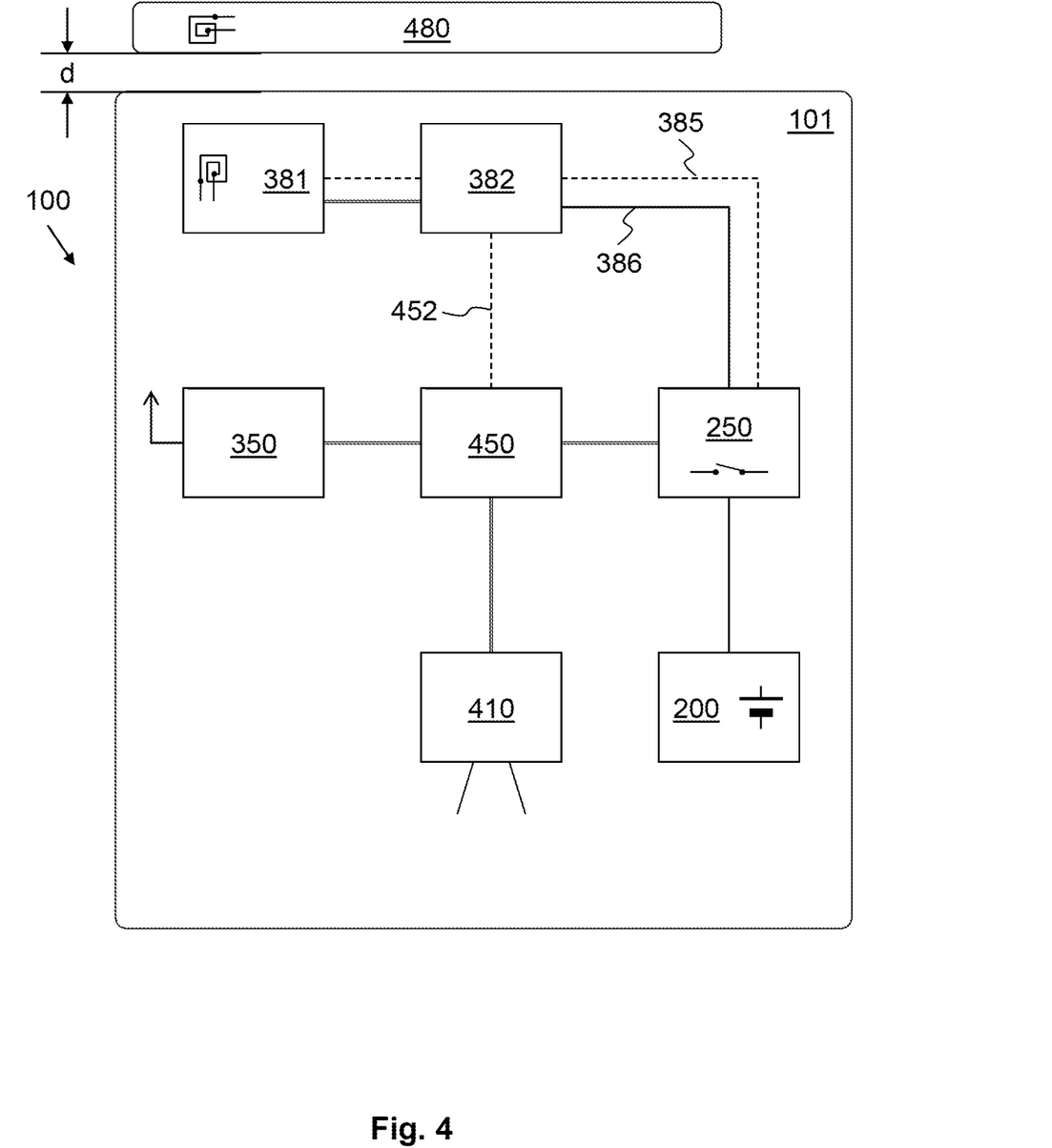
FIG. 4 schematically shows another embodiment of a unit.

A further improved interaction between HMI 480 and measuring device 100 is shown in FIG. 4. The energy or command transmitted by HMI 480 first causes switch 250 to close, whereupon processor 450 is initialised and/or boots. Then the RFID chip 382 is supplied with energy from the energy storage 200, for example via the line 386 which is connected to the RFID chip(s) 382. By connecting additional energy to the RFID chip 382, it becomes independent of the energy transmitted by the reader 480, which makes it possible to connect directly to the processor 450 via a communication line 452. The processor 450 can therefore read information directly from the memory 383 of the RFID chip 381 and also write information back into it, whereupon it is transmitted wirelessly to the operator interface 480 via the antenna 381. Compared to communication via the cloud, the achievable data throughput rates are greatly improved on the one hand, but on the other hand the latency times are also greatly reduced, which can contribute to an intuitive interaction of the user with the measuring device. The communication path shown above is independent of the low-power communication device 350, and enables in particular the fast transmission of larger data volumes, for example during a software update. After removing the reader 480, the RFID chip 382 deactivates the controllable switch 250 via line 385, whereupon the system returns to its idle state and continues to use minimal power.

The system as shown in FIG. 4 enables smooth interaction with the measuring device 100. Ergonomically unfavourable, however, is the fact that a distance d between the housing 101 of the measuring device 100 and the operating device 480 must be kept within a range of a few cm (up to about 10 cm maximum) during the entire operating sequence. Depending on the mounting position of the measuring device 100, this can result in uncomfortable postures of the user, which reduce the ease of operation.

Figure 5A:
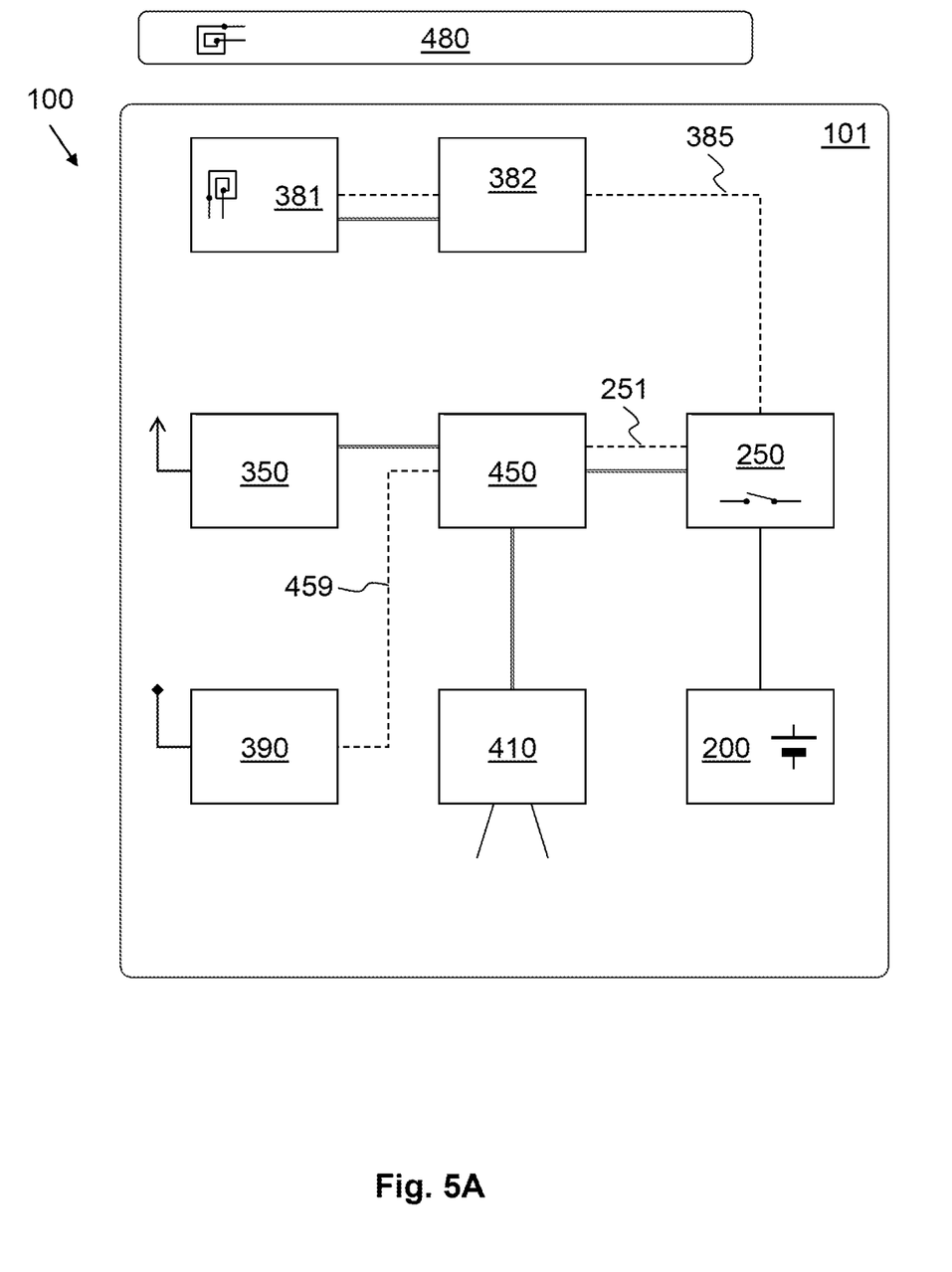
FIG. 5 schematically shows another embodiment of a unit.
Figure 5B:
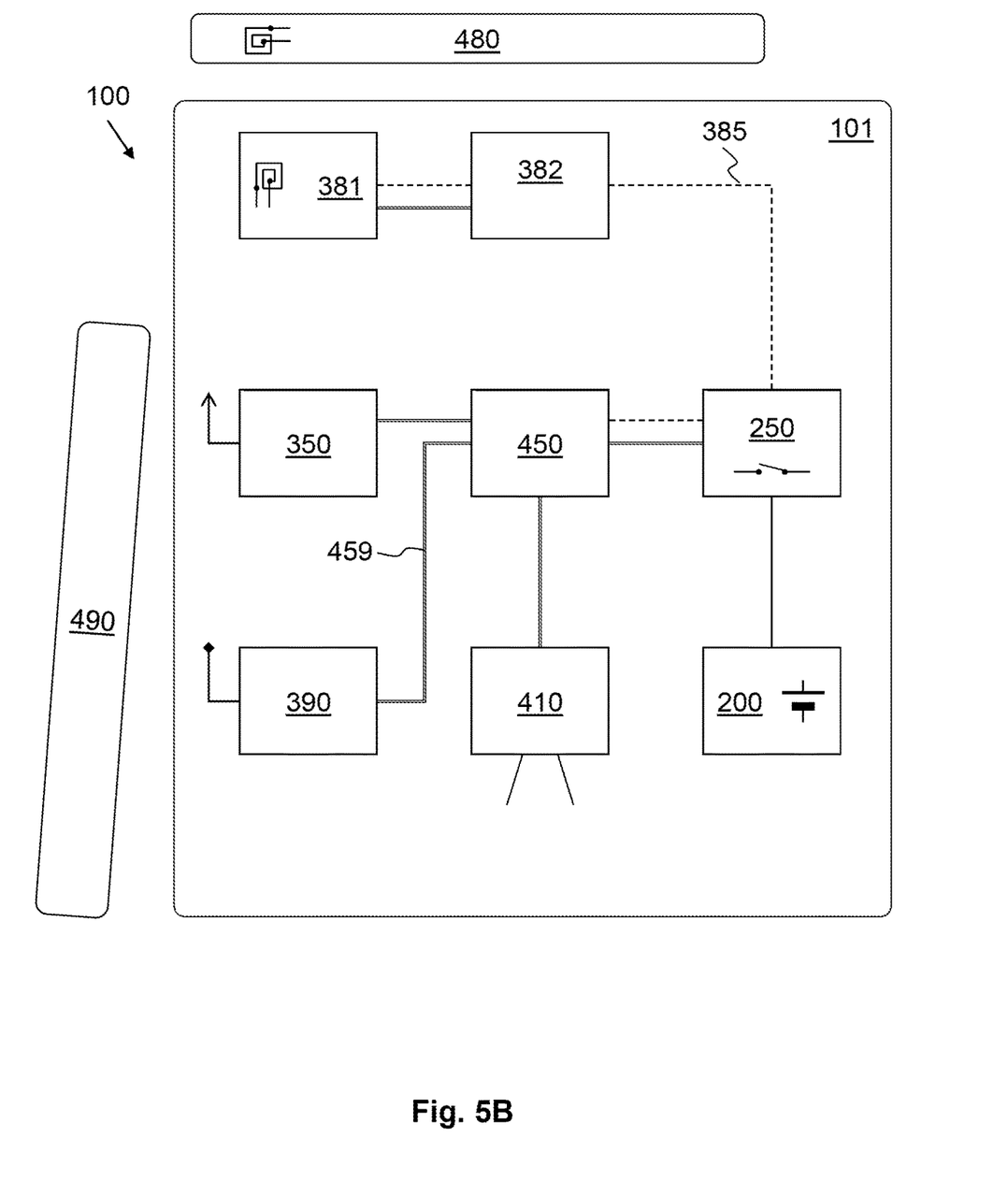

FIG. 5A shows a further embodiment of a meter 100, which further increases the ease of use for the user. The sensor is equipped with the RFID circuit 382 of FIG. 3, which closes the electronic switch 250 after transferring energy to the coil 381 by means of connection 385. The processor 450 is subsequently supplied with power, which causes it to reinitialise and/or boot. The processor 450 realises self-holding via a feedback line 251, i.e. it supplies the controllable switch 250 with signals which are suitable for continuously maintaining the power supply. The control unit 480 can therefore be removed from its immediate vicinity (distance d), allowing the user to assume a comfortable operating position. FIG. 5B shows the corresponding configuration. After successful initialisation and/or booting via a control and communication line 459, the processor 450 activates a further, secondary communication device 390. In contrast to the primary communication device 350, which, for reasons of energy saving and range, preferably uses a communication standard from the LPWAN family (e.g. LPWANs), the secondary communication device 390 is used in the same way as the primary communication device 350.(e.g. LoRa, Sigfox, NB-IOT), more energy-intensive standards, preferably communication standards from the WPAN family (e.g. IrDA, Bluetooth) or WLANs, are used for the secondary communication device 390. The range of these standards is a few metres, which allows comfortable operation of the sensor. Since the sensor is only operated for a relatively short period of time, the Energy Storage 200 can easily provide the increased power supply required for this without any noticeable loss of service life. The operating device 490 now communicates via the secondary communication device 390 and by means of the secondary communication standard with the measuring device 100, for example to read measured values, parameters or error messages and/or to import parameters or software updates into the device 100.

Figure 6:
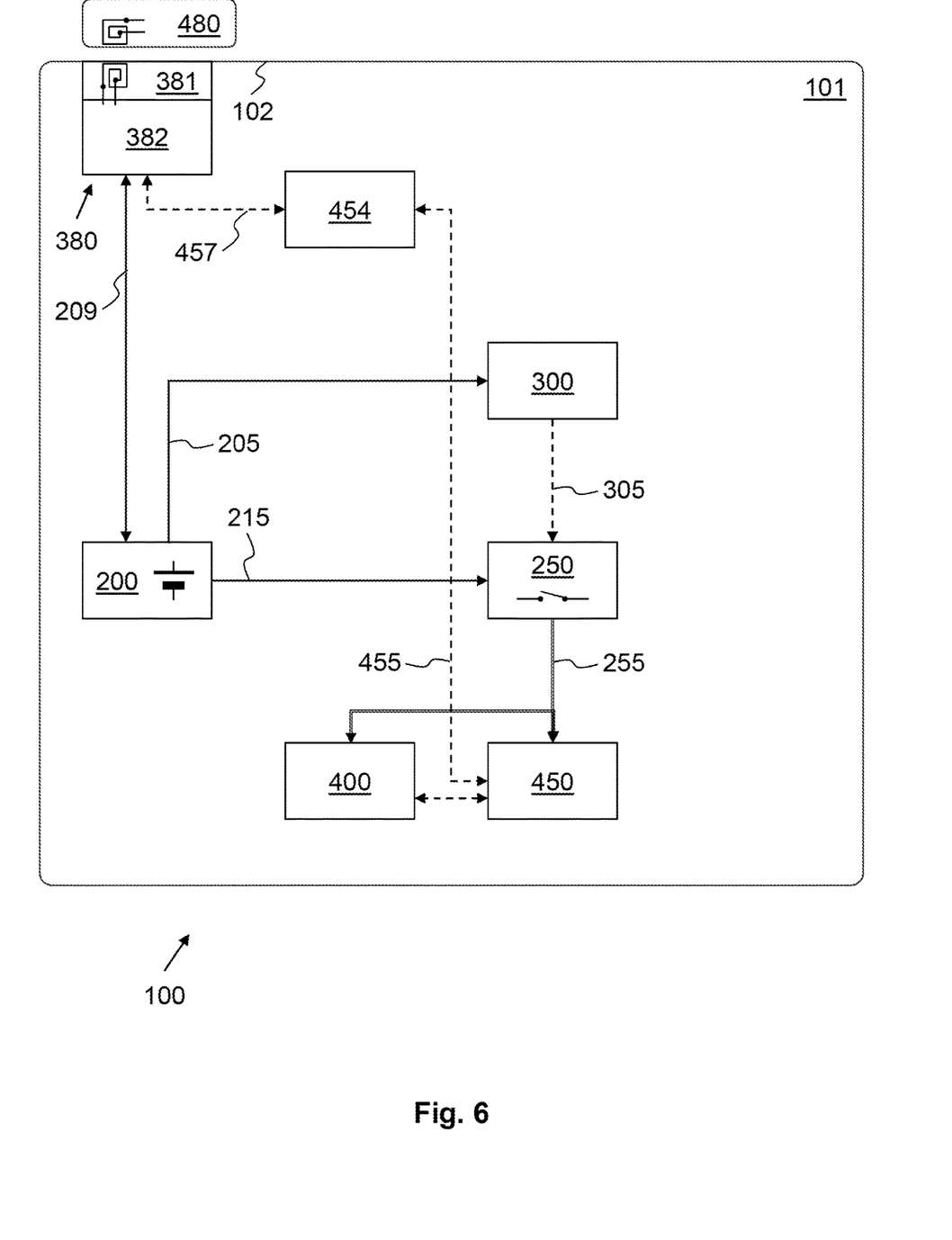
FIG. 6 schematically shows another embodiment of a unit.

The example of the embodiment of the measuring instrument 100 in FIG. 6 has a housing 101, which is used in particular to protect the instrument 100 from the effects of the weather. The housing 101 can be completely encapsulated in some versions. The unit 100 has an energy storage 200. This can be a battery, an accumulator, a fuel cell or a similar device. The energy storage 200 is connected to a control unit 300 via a first line 205. The control unit 300 controls a controllable switch 250 via the control line or interface 305. The controllable switch 250 is connected to the energy storage unit 200 via line 215. Furthermore, a computing unit 450 and a consumer 400 are connected to the switch 250 via line 255. The computing—unit 450 is connected to a memory 454 via an interface 455. The memory 454 can be connected directly or indirectly to the memory 383 of the RFID electronics 382 or can partially overlap with it. For example, the user 400 can be a measuring front end 410 and/or a display front end 420 and/or another device. The controllable switch 250 can thus completely and permanently switch off the power supply of the consumer 400 and the computing unit 450. Due to the arrangement shown, it is even possible to completely disconnect all consumers 400, which are located behind the switch 250 ("behind": seen from the energy storage 200). This system architecture means that it is no longer necessary for the entire measuring or display unit 100 to remain continuously switched on, but parts of the unit 100—in the example in FIG. 6: the calculation unit 450 and one or more consumers 400—can be switched off when no measurement is taking place. In the case of a display unit, parts of the unit 100 may be switched off when no display is taking place. As the elements consumer 400 and calculator 450 consume most of the electricity of the device 100, the energy consumption in the example shown can be reduced by several orders of magnitude; because a measurement or display or updating of a display takes significantly less than one second, but the intervals between measurements or changes to a display can be hours or even several days. In one version, the switch 250 can be set up to switch on and off the displayed loads 400 either together or selectively.

The device 100 still has an RFID unit 380. The RFID unit 380 can, for example, be located in or on the housing wall 102 of the housing 101. In the embodiment shown, the RFID unit 380 is continuously connected to the energy storage unit 200 via line 209. In another version, line 209 can be omitted, so that the RFID unit 380 only draws power from an external communication device. In another version, the unit 100 can be connected to an external power supply, for example to a mains supply.

The RFID unit 380 has an RFID antenna 381 and an RFID circuit 381. The RFID antenna 381 can be designed as a coil. The RFID circuit 381 supports the protocol used in the unit 100, for example, an NFC protocol or a proprietary protocol. The proprietary protocol can be a superset of a standard protocol. The RFID unit 380 is set up to respond to an external command, in particular from an external communication device 480, and, if necessary, to exchange data with the memory 454 and/or the memory 383 of the RFID electronics 382 (not shown here). The command is a type of data transmission that instructs control devices or controlling components in the device 100 to perform predefined actions. The command can consist of transferring data from the RFID unit 380, via the interface 457, to the memory 454 of the computing unit 450. The command can consist of transferring data from the memory 454 to the RFID unit 380. The command can also consist of charging an energy storage device of the device. This can be done via the optional current transmission path 209 (if this is available in the version of the device 100 used).

Figure 7:
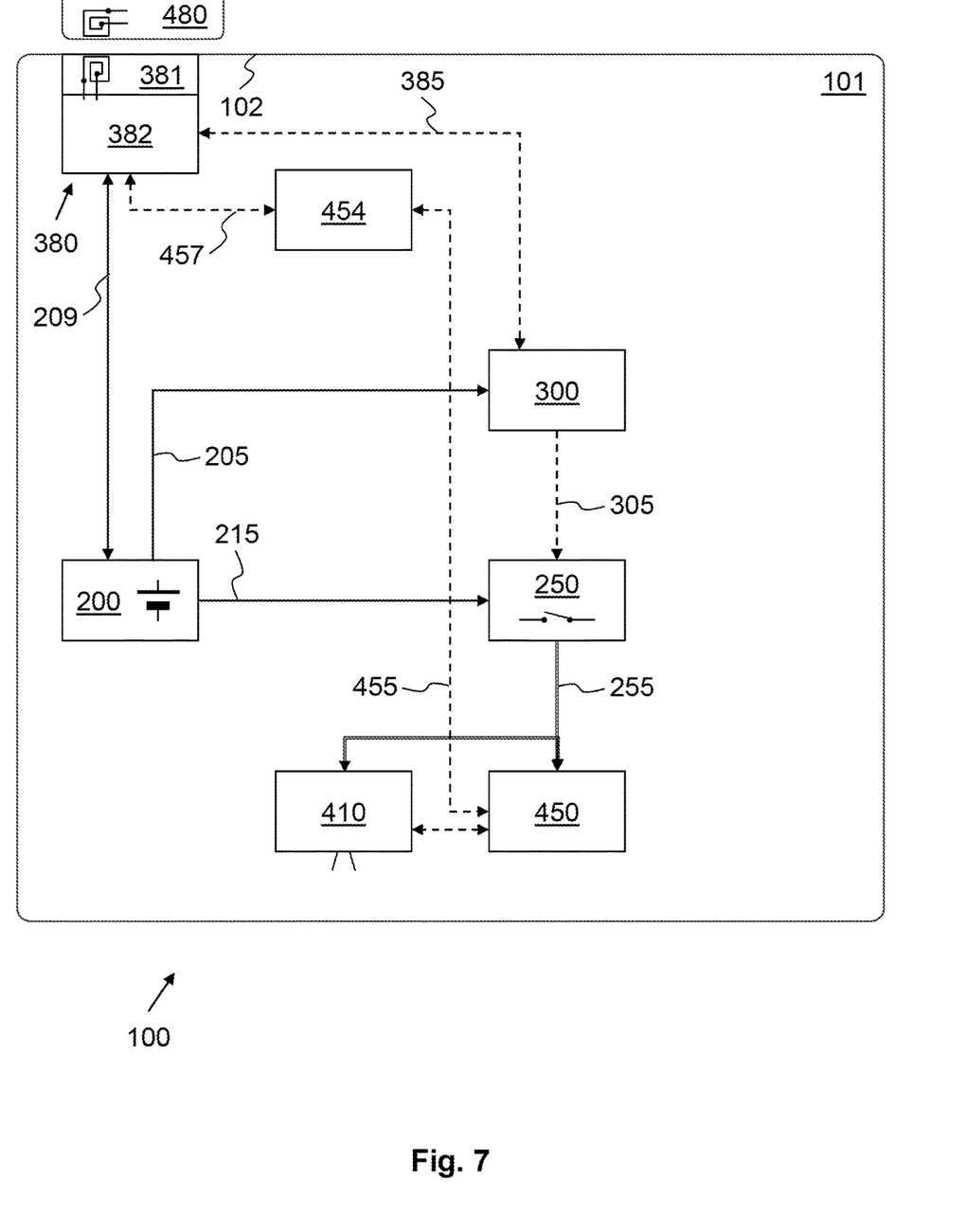
FIG. 7 schematically shows another embodiment of a unit.

The embodiment of unit 100 in FIG. 7 has the same elements as FIG. 6 and is also provided with the same reference signs. In addition, FIG. 7 has an interface 385, by means of which the RFID unit 380 can control a control unit 300. This allows the switch 250 to be controlled and thus switch the components behind the switch 250 on and off. In one version, the switch 250 can also be controlled directly by the RFID unit 380. In the embodiment shown, the components are a measuring front end 410 and the calculation and control unit 450. The calculation unit 450 is connected to the memory 454, so that, by means of this memory 454, data can be exchanged with the RFID unit 380 during operation. When the calculation unit 450 is switched off, the data entered by the RFID unit 380 in the memory 454 can be used—for control or calculations—or data entered by the calculation unit 450 can be read from the RFID unit 380.

Figure 8:
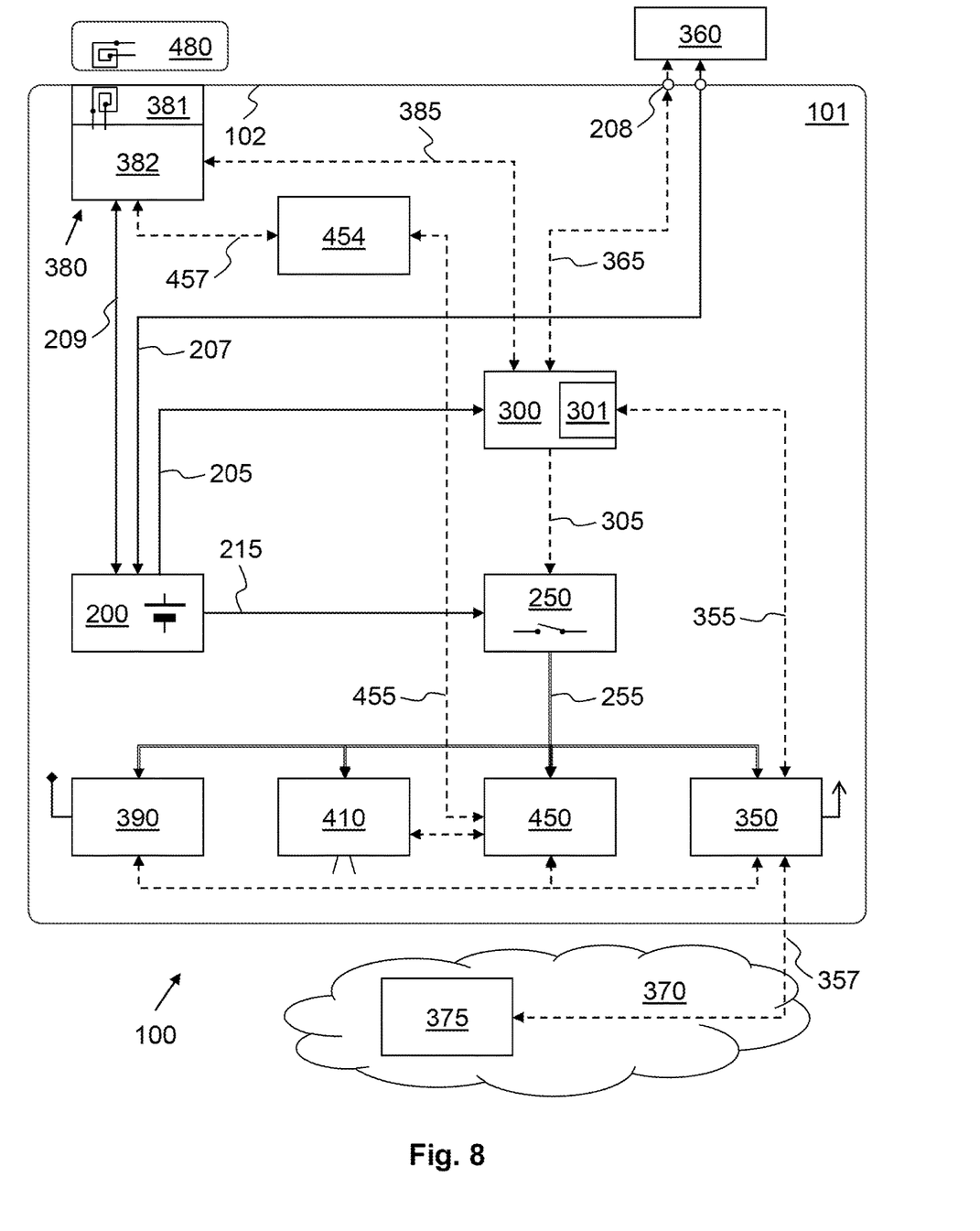
FIG. 8 schematically shows another embodiment of a unit.

The embodiment of FIG. 8 shows, in addition to the elements of FIG. 7, other elements of a battery-powered device 100, which is designed as a battery-powered device. The unit 100 has a radio unit 350 which is connected to the energy storage 200 via switch 250. The radio unit 350 is configured to send and receive information. The radio unit 350 can only be operated if the switch 250 is switched on and the radio unit 350 is thus connected to the energy storage tank 200. The radio unit 350 is also particularly suitable for transmitting time information about the next measurement via a first interface 355 to the time management unit 301, which can be part of the control unit 300, and/or for receiving time information from the time management unit 301 if switch 250 is switched on. The time information can be an absolute time, a relative time and/or a combination or repetition of absolute or relative time. The radio unit 350 can communicate with a server 375 located in a cloud 370. This allows, for example, measured values or time information to be exchanged. The radio unit 350 can also—by means of the time management unit 301, which is part of the control unit 300—control the control unit 300 with time information.

Furthermore, the execution example shows a communication device 390. The communication device 390 can, for example, use short-range radio technology, e.g. a protocol from the Wireless Personal Area Network (WPAN) family, an IrDA (Infrared Data Association) protocol or a proprietary protocol. The connection can also use a wireless LAN (WLAN). Communication device 390 can be used, for example, to read measurements, parameters or error messages and/or to download parameters or software updates, for example, into memory 454 of the unit 100.

The model shown also features a console 360, which is connected to the energy storage unit 200 via line 207 and a connection 208. The 208 connection can be implemented as a plug and in one version can also be used to connect the 365 interface. The console 360 can have its own energy storage device (not shown in FIG. 7), which can be configured to charge the energy storage device 200 of the machine 100—if the energy storage device 200 is designed to be rechargeable.

The calculation unit 450 can directly exchange information with the consumer 400 (or measuring front end 410 and/or display front end 420), the radio unit 350, the communication device 390. With the RFID unit 380, the calculation unit 450 can exchange information via the memory 454.

Figure 9:
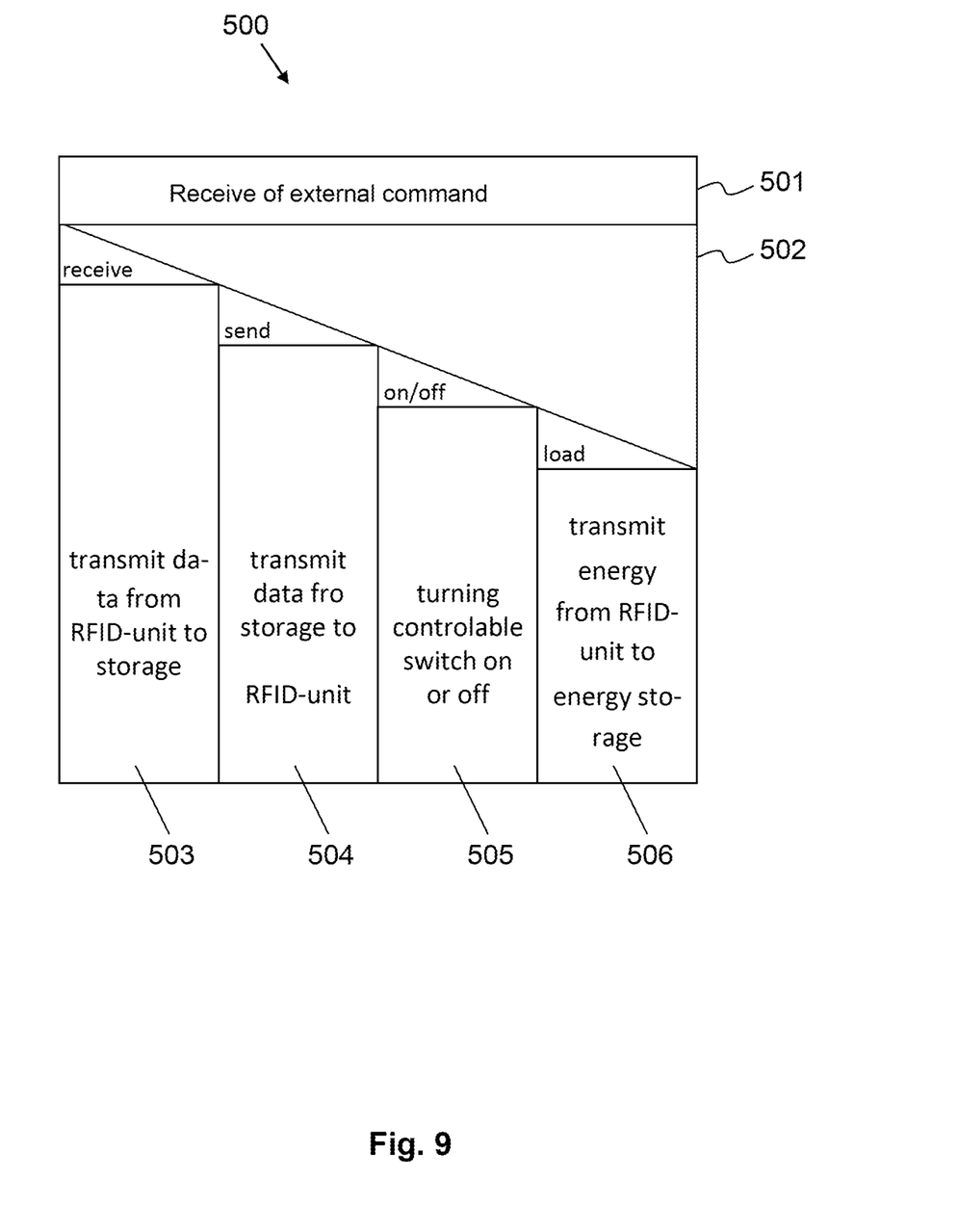
FIG. 9 shows a procedure for operating a machine.

In FIG. 9 a method 500 for operating a battery-powered device 100 is shown schematically in the form of a Nassi-Shneiderman diagram. In step 501, an external command is received from the device 100 by means of an RFID unit 380. In particular, the command may have been sent from an external communication device 480. The command is a type of data transmission that triggers control units in the device to carry out predefined actions. The predefined action is determined in step 502.

If the command involves receiving data, step 503 is performed. In step 503, the data is transferred from the RFID unit 380 to a memory 454 of the calculation and control unit 450 in the unit 100. The data can be parameterisation data, for control data, for measurement data, for time information and other types of data.

If the command involves sending data, step 504 is performed. In step 504, the data is transferred from memory 454 to the RFID unit 380. The RFID unit 380 can store, buffer and/or forward the data to the communication device 480. The data can be of the same type as the received data. The data can also be e.g. measured values or variables of the processor, so that—together with corresponding send commands—even debugging of the device is possible.

If the command involves turning the machine on or off, step 505 is performed. In step 505, the RFID unit 380 controls the control unit 300 via interface 385 and the control unit 300 controls the controllable switch 250 via the control line or interface 305 to switch on or off all or a selection of the devices connected via supply line 255. In the case of a design that supports permanent switching on, this can be achieved, for example, by means of a self-retaining circuit. In the case of a design which supports permanent switch-on, this can also be selected and implemented e.g. by means of a self-locking circuit (not shown).

If the command involves charging an energy storage device of this machine, step 506 is performed. In step 506, energy is transferred from the RFID Unit 380 to the Energy Storage Unit 200. In models where the RFID unit 380 is configured to charge the energy storage device 200, the control paths and the power transmission path 209 are enabled.

Figure 10:
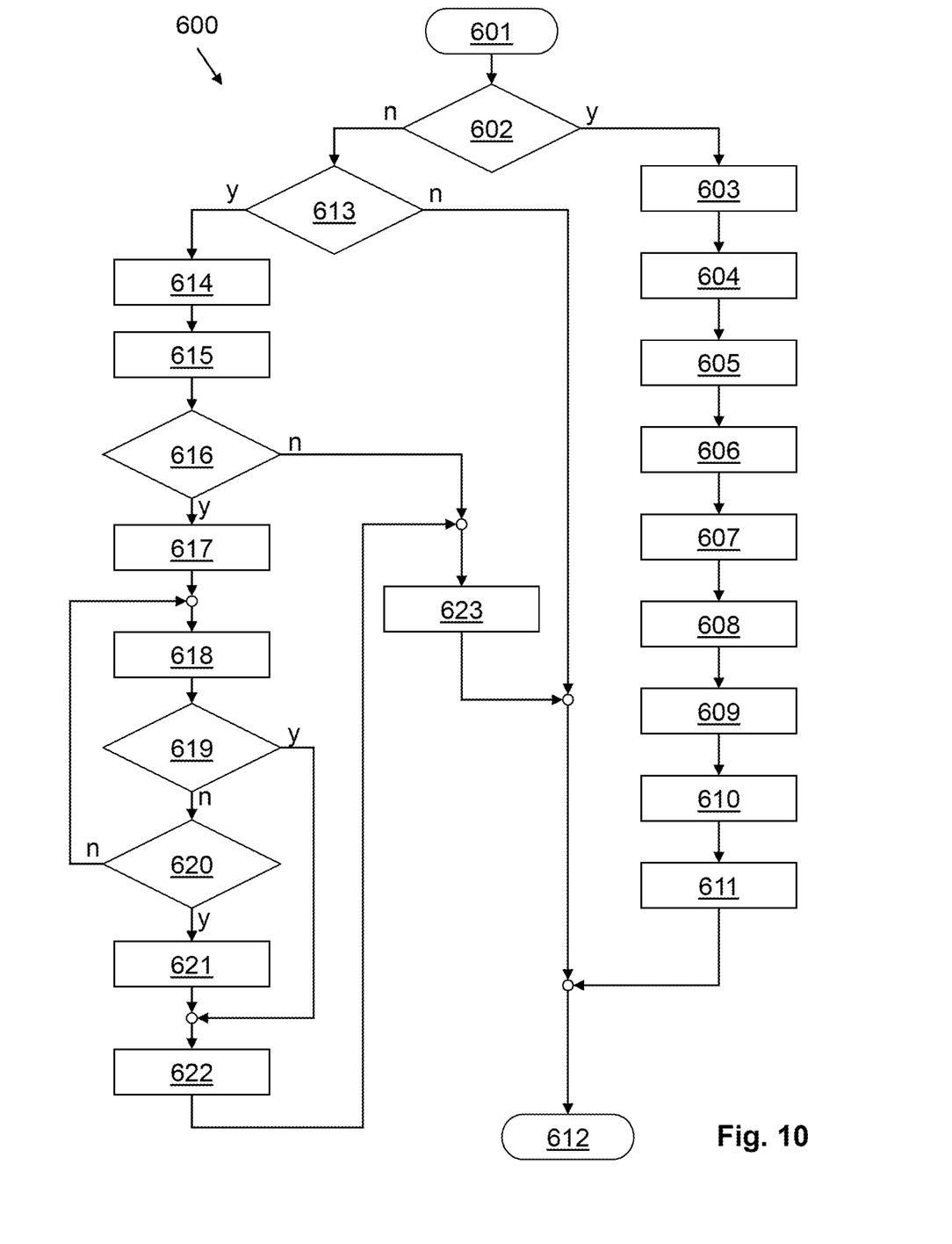
FIG. 10 shows a further procedure for operating a machine.

FIG. 10 shows a flow chart for the operation of the unit 100. The method 600 starts in the initial state 601. In step 602 it is checked whether the predefined time interval between two measurements has already elapsed.

If this is the case, the processor is activated in step 603, which in this example corresponds to initialising and/or booting and/or waking up from an energy-saving power-down mode. In step 604 the processor 450 activates the measurement value determination unit 410, which can be designed as a high frequency front end, ultrasonic front end or laser front end. In step 605, the actual measurement to determine the distance to the product is executed and the determined result is transmitted to the processor 450. In step 606, the measured value determination unit 410 is deactivated again to save energy. In step 607, the processor determines the distance to the product and/or values that can be derived from it (volume, filling level, etc.) on the basis of the transmitted data. To transmit this measured value, the primary communication unit 350 is activated in step 608, which transmits the measured value to a network infrastructure in step 609 using an LPWAN method. In step 610, the primary communication unit 350 is deactivated again to save energy. In step 611, the processor 450 causes the controllable switch 250 to be opened, which deactivates the processor. The sequence of process steps described above essentially describes the normal measurement sequence as it can take place in a measuring device 100.

If it is determined in step 602 that the time until a repeated measurement has not yet expired, it is subsequently checked in step 613 whether external energy is fed in via antenna 381. If this is the case, in step 614 the processor 450 is supplied with power and initialised and/or booted. In step 615 the processor first checks whether a correct access password is transmitted via interface 381 to activate communication. If this is the case and the password is correct, the processor activates the secondary communication device in step 617, for example a Bluetooth chip 390. In step 618, the user interacts with the meter 100 via the secondary communication device using the external reader 480, for example a smartphone 480. In step 619, the processor checks whether the user has requested an end to the communication, for example by closing an app on the smartphone. If this is the case, the secondary communication device 390 is immediately deactivated in step 622, before the processor is also deactivated in step 623 by appropriate control signals via the controllable switch 250. If no user-indexed termination of communication is detected in step 619, step 620 checks whether the user has exceeded a specified period of inactivity. If this is the case, step 621 assumes that a regular termination of the external keypad 480 has been missed, whereupon a last message is sent to the outside that the sensor will return to its idle state. After deactivating 622 the secondary communication device and disabling 623 the processor, the procedure ends in the final state 612.

In addition, it should be noted that "comprising" and "having" does not exclude other elements or steps and the indefinite articles do not exclude "a" or "an" a multitude. It should also be noted that features or steps described by reference to one of the above examples may also be used in combination with other features or steps of other examples described above. Reference marks in the claims are not to be considered as restrictions.

LIST OF REFERENCE SIGNS

100 Measuring device, display device, device
101 Housing
102 Housing wall
200 Energy storage
205, 207, 209, 215 Cable
208 Connection
220 Energy control unit
250 Controllable switch
251 Feedback line
255 Cable, supply line
300 Control unit
301 Time management unit
305, 355, 365 Interface
350 Wireless communication device
357 Connection
360 Console
370 Cloud
375 Server
380 RFID unit
381 RFID antenna, coil
382 RFID circuit
383 Memory of the RFID unit
385, 386 Cable
390 Secondary communication device
400 Consumers
410 Measuring front end
420 Display front end
450 Computing unit, control unit
452 Communication line
454 Memory
455, 457 Interface
459 Communication line
480 External control panel
490 Operating unit
500 Method
501 . . . 506 Step
600 Method
601 Start condition
602 . . . 611, 613 . . . 622 Step
612 End state
623 Deactivation

The invention claimed is:

1. A device for measuring or displaying at least one of a level measurement, a flow measurement, or a pressure measurement, the device comprising:
   a controllable switch;
   an energy storage;
   a memory;
   a control unit; and
   a radio frequency identification (RFID) unit configured to communicate with the control unit and receive an external command from an external communication device, wherein the RFID unit is configured to:
      if the external command includes receiving data, transmit the data from the RFID unit to the memory;
      if the external command includes sending data, transmit the data from the memory to the RFID unit;
      if the external command includes switching on or off the device for measuring or displaying, switch on or off the controllable switch with a control of the control unit; and
      if the external command includes charging the energy storage, transfer the energy from the RFID unit to the energy storage.

2. The device according to claim 1, wherein the RFID unit comprises an RFID antenna and an RFID circuit.

3. The device according to claim 1, further comprising:
   a computing and control unit connected to the energy storage via the controllable switch, wherein the processor is connected to the memory.

4. The device according to claim 1, wherein the RFID unit uses a near field communication.

5. The device according to claim 1, further comprising a consumer device configured to transmit data to and receive data from a server using a low energy wide area network.

6. The device according to claim 5, wherein the consumer device further comprises a communication device arranged to transmit data to and receive data from the server.

7. The device according to claim 6, wherein the communication device is configured to communicate via a Wireless Personal Area Network (WPAN) or a Wireless Local Area Network (WLAN).

8. The device according to claim 1, further comprising:
   a console configured to be connected to the energy storage via a further line,
   wherein the console is configured to switch the controllable switch on and off by control of the control unit.

9. The device according to claim 8,
   wherein the control unit includes a time management unit which is configured to control the controllable switch by means of time information received from at least one of the RFID unit, a radio unit, or the console, and
   wherein the time information is at least one of a point in time, a time span, or a time grid.

10. The device according to claim 1, further comprising:
    an energy control unit configured to control current supply to a load connected by the controllable switch, and
    wherein, when there is more than one load, the control unit controls the controllable switch to selectively control the current supply to the loads.

11. A method of operating the device for measuring or displaying according to claim 1, the method comprising:
    receiving the external command, by the RFID unit, from the external communication device;
    if the external command includes receiving data, transmitting the data from the RFID unit to the memory in the device for measuring or displaying;
    if the external command includes sending data, transmitting the data from the memory to the RFID unit;
    if the external command includes switching on or off the device for measuring or displaying, switching on or off the controllable switch, by means of the RFID unit and the control unit; and
    if the external command includes charging an energy storage the measuring or display device, transferring the energy from the RFID unit to the energy storage.

12. A non-transitory computer-readable storage medium comprising computer program instructions stored therein, which, when executed on a computing and control unit of the measuring device or display device, instructs the measuring device or display device to perform the method according to claim 11.

13. The device according to claim 1, further comprising a console which comprises an energy storage device, wherein the console is configured to switch the controllable switch on and off by control of the control unit.

* * * * *